F. J. MORRIS.
DUSTPAN.
APPLICATION FILED APR. 28, 1919.
1,346,380.
Patented July 13, 1920.
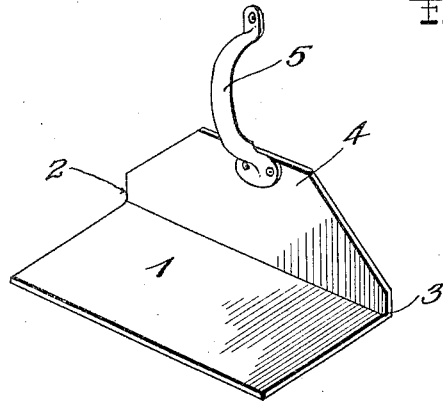
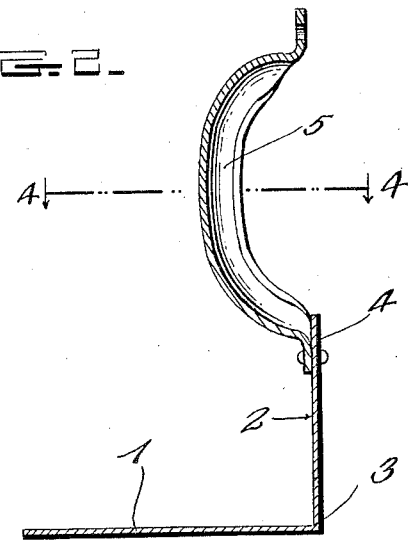
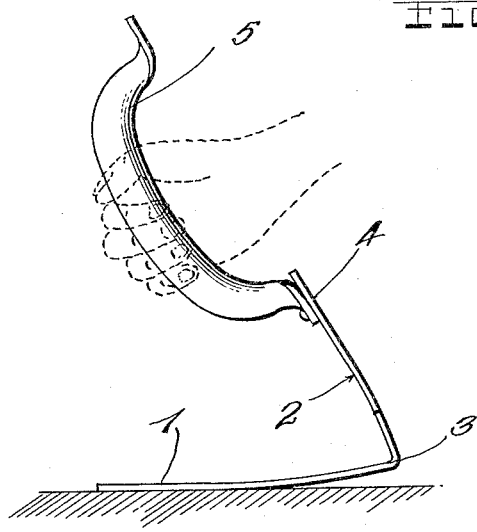
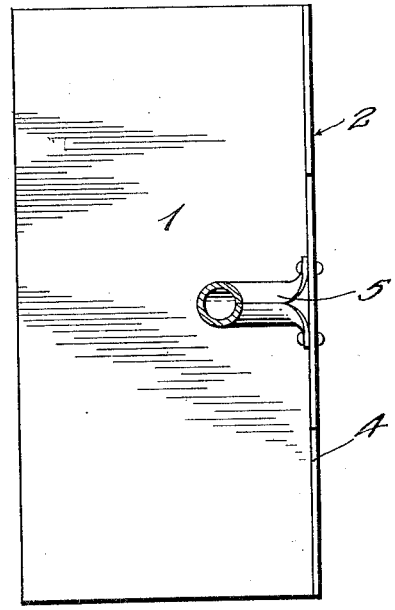
Inventor
FIELDS J MORRIS

UNITED STATES PATENT OFFICE.

FIELDS J. MORRIS, OF DURANGO, COLORADO.

DUSTPAN.

1,346,380.  Specification of Letters Patent.  Patented July 13, 1920.

Application filed April 28, 1919. Serial No. 293,114.

*To all whom it may concern:*

Be it known that I, FIELDS J. MORRIS, a native-born citizen of the United States, residing at Durango, in the county of La Plata and State of Colorado, have invented certain new and useful Improvements in Dustpans; and I do declare the following to be a full, clear, and exact description of the invention, such as will enable others skilled in the art to which it appertains to make and use the same.

The primary object is to provide a simple and improved dust-pan, formed from a single piece of highly resilient sheet metal so that in operation it may be manipulated to gather all the dust on a floor.

Another object is to provide a device of this character having a highly resilient bottom and an integrally formed resilient wall, carrying an operating handle positioned to give a maximum leverage, in operation.

With these and other objects in view, the invention consists of certain novel features of construction, and the combination and arrangement of parts as will be more fully described and claimed, the descriptive matter being supplemented by the accompanying drawing, in which:

Figure 1 is a perspective view of a dust-pan embodying my invention.

Fig. 2 is a vertical sectional view thereof.

Fig. 3 is a side elevation of the pan in use.

Fig. 4 is a sectional view taken on the line 4—4 of Fig. 2.

The blank from which the pan is formed, is substantially rectangular in shape and is bent longitudinally at right angles at a point 3 near its center to form an upstanding wall 2 of considerable height.

A suitable handle 5 is secured to the wall 2 near its upper edge, the handle in the drawing being tubular in cross section, although it may be formed from sheet metal similar to that from which the pan body is manufactured. The handle is curved longitudinally its entire length so as to form a convenient grip for the hand and may be of a length as to eliminate the necessity of the operator bending downward to brush dust and dirt into the pan. As illustrated in Fig. 3 the main body of the handle is disposed in advance of the wall 2, thereby providing considerable leverage in operation.

In manipulating the dust pan, the operator grasps the handle and places the pan upon the floor, then by pushing the handle forward bends the wall forward and slightly raises the adjacent portion of the bottom 1 from the floor. As clearly illustrated in Fig. 3, this operation results in forcing the front edge and a small portion of the side edges into extremely close contact with the floor thereby preventing dust and dirt from being brushed under the pan.

The wall 2 has its upper corners cut away at an angle of approximately 45°, as at 4 so when it is desired to empty the contents of the pan into a receptacle, either end of said pan may be used as a spout and projected into the receptacle to avoid spilling the contents.

While I have described my invention as a dust pan, it may be used as a grain scoop and for other purposes.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim:

1. A dust pan comprising a substantially rectangular piece of resilient sheet metal bent at right angles at approximately its longitudinal center to form a flat bottom capable of springing upwardly at its rear edge, and a vertical wall of considerable height capable of springing forwardly at its upper end, said upper end having its corners cut away, a handle secured centrally to the upper edge of the wall and rising vertically therefrom, said handle providing means for bending the wall forwardly to force the front edge of the bottom into contact with the floor.

2. A dust pan comprising a substantially rectangular piece of resilient sheet metal bent at right angles at approximately its longitudinal center to form a flat bottom capable of springing upwardly at its rear edge, and a vertical wall of considerable height capable of springing forwardly at its upper end, said upper end having its corners cut away, a handle secured centrally to the upper edge of the wall and rising vertically therefrom, said handle being curved forwardly and upwardly in advance of the wall whereby a maximum leverage is obtainable to bend the wall forwardly and force the front edge of the bottom into contact with the floor.

In testimony whereof I have hereunto set my hand.

FIELDS J. MORRIS.